(12) United States Patent
Weber et al.

(10) Patent No.: US 8,392,617 B1
(45) Date of Patent: Mar. 5, 2013

(54) BROWSING CONTEXT CONTINUATION ACROSS MULTIPLE DEVICES

(75) Inventors: Arnaud Claude Weber, Saratoga, CA (US); Alex Neely Ainslie, San Francisco, CA (US); Roma Rajni Shah, San Francisco, CA (US); Glen Murphy, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/312,950

(22) Filed: Dec. 6, 2011

(51) Int. Cl.
*G06F 15/16* (2006.01)
(52) U.S. Cl. ......... 709/248; 709/203; 709/227; 709/228
(58) Field of Classification Search ........................ None
See application file for complete search history.

(56) References Cited

U.S. PATENT DOCUMENTS

| | | | |
|---|---|---|---|
| 6,874,037 B1* | 3/2005 | Abram et al. | 709/248 |
| 6,976,094 B1* | 12/2005 | Dalrymple et al. | 709/248 |
| 7,917,521 B2 | 3/2011 | Brown et al. | |
| 7,925,698 B2* | 4/2011 | Caspi et al. | 709/204 |
| 2004/0044799 A1* | 3/2004 | Sivaraman et al. | 709/253 |
| 2009/0307375 A1* | 12/2009 | McCarthy | 709/248 |
| 2009/0307376 A1* | 12/2009 | McCarthy et al. | 709/248 |
| 2011/0239133 A1* | 9/2011 | Duffus et al. | 715/753 |

OTHER PUBLICATIONS

Wyman, Alice, et al., "Firefox Help—What is Firefox Sync?", retrieved from <http://support.mozilla.com/en-US/kb/what-firefox-sync>, retrieved on Dec. 6, 2011, p. 1.
"TabCloud", retrieved from <http://chrometabcloud.appspot.com/>, retrieved on Dec. 6, 2011, pp. 1-17.
Pash, Adam, "Sync Your Firefox Extensions and Profiles Across Computers", Jun. 26, 2007, retrieved from <http://lifehacker.com/software/hack-attack/sync-your-firefox-extensions-a...>.
"Firefox Sync", Wikipedia, Apr. 26, 2011, retrieved from <http://en.wikipedia.org/wiki/Firefox_Sync>.

* cited by examiner

*Primary Examiner* — Mohamed Ibrahim
(74) *Attorney, Agent, or Firm* — McDermott Will & Emery LLP

(57) ABSTRACT

Configurations for automated synchronization of browser data from a desktop web client (e.g., a desktop web browner) to a web client on a mobile device are provided. In particular, session data including navigation history data of one or more visited web pages on the desktop web client can be synchronized with a mobile device. Initially, session data from the desktop web client can be received over a network. In some configurations, a notification can then be transmitted to a mobile device for indicating session data is available for synchronizing with a mobile web client on the mobile device. The session data is then transmitted to the mobile web client. On the mobile device, the received session data can be displayed in a window of the mobile web client.

26 Claims, 7 Drawing Sheets

BROWSING CONTEXT CONTINUATION ACROSS MULTIPLE DEVICES

BACKGROUND

In a given web client (e.g., a web browser), web content can be displayed in the web client. For example, web content can include a mixture of text and graphics (e.g., images or photos, etc.). Different web clients are available for displaying web content. For example, a desktop web client can display web content. In another example, a mobile web client on a mobile device can display web content.

SUMMARY

The subject technology provides for automatically synchronizing session data from one or more web clients. The subject technology determines whether updated session data from the one or more web clients is available. The updated session data indicates browsing activity on the one or more web clients and includes web page form element data based on user input. The subject technology then receives updated session data from the one or more web clients over a network if the updated session data is available.

The subject technology further provides for storing session data from one or more web clients for synchronizing with a first web client. The subject technology determines whether updated session data is available in the one or more web clients in which the updated session data includes web page form element data based on user input. The subject technology then transmits a request for the updated session data if the updated session data is available. The updated session data is then received from the one or more web clients. The subject technology then stores the updated session data.

Yet another aspect of the subject technology provides a system for automatically synchronizing session data from one or more web clients. The system includes memory, one or more processors and one or more modules stored in memory and configured for execution by the one or more processors. The system includes a session monitoring module configured to determine whether updated session data is available on the one or more web clients in which the updated session data indicates browsing activity on the one or more web clients and includes web page form element data based on user input. The system further includes a notification module configured to transmit a notification to a first web client if the updated session data is available. Further, the system includes a synchronization module configured to transmit the updated session data over a network to the first web client.

The subject technology further provides for determining whether updated session data is available in one or more web clients in which the updated session data includes web page form element data based on user input. The subject technology transmits a request for the updated session data if the updated session data is available. The updated session data is then received from the one or more web clients. The subject technology stores the updated session data. Additionally, the subject technology transmits the updated session data over a network to a first web client.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

Figure 1:
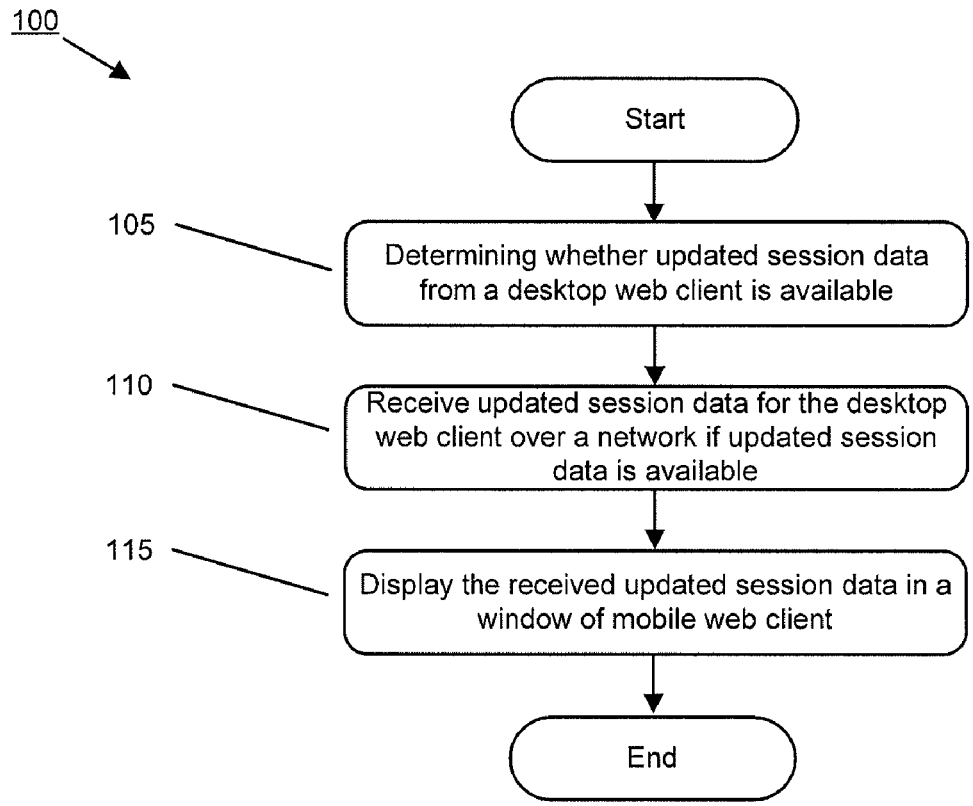
FIG. 1 conceptually illustrates an example process for automatically synchronizing session data from a desktop web client to a mobile device.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology provides automated synchronization of browser data from a desktop web client (e.g., a desktop web browser) to a web client on a mobile device. During a session with the desktop web client, a user may interact with the desktop web client by navigating to one or more different pages in which one or more tabbed windows can display the aforementioned pages. The user in one example submits search queries to a search engine and the search result items can be displayed by the desktop web client in a corresponding tabbed window. The user can subsequently open one of the search result items in a different tabbed window. In some instances, the user may wish to have the state of the session including the tabbed window activity synchronized to another device, such as a mobile web client (e.g., a mobile web browser) on a mobile device (e.g., cell phone, smartphone, tablet, etc.). However, a user's session data for tabbed window activity of visited web pages from the desktop web client is not easily synchronized with a mobile web client so that the mobile web client can re-display the tabbed window activity (e.g., from the session on the desktop web client).

To address the aforementioned issue(s), a process for synchronizing session data from a desktop web client to a mobile device is provided. In one example, the mobile device can subscribe to receive notifications from a notification server when updates to the desktop web client's session data occur (e.g., as the user browses different web pages). For instance, as the user interacts with the desktop web client by navigating to one or more web pages, the desktop web client can transmit updated session data to a remote server (e.g., storage server) for storage. The notification server of some configurations tracks updates to the session data on the remote server and can periodically transmit one or more notifications to the mobile device indicating that updated session data is available. The mobile device can then receive the updated session data from the remote server after receiving the notification. When a mobile web client is activated on the mobile device, the updated session data is available (e.g., in one or more tabbed windows) on the mobile web client for the user to access. The updated session data can include the navigation history of visited web pages from the desktop web client.

In addition to the data described above, the subject technology can include additional types of data for synchronizing the data in a browsing context or session to the mobile device. For instance, data for persisting web page form elements can be synchronized. In one example, a web search can be performed in a web search engine on the desktop web client (e.g. by inputting one or more search query keywords in a textbox form element on a web page of the web search engine). One or more search query keywords entered in a textbox form element in the web page of the web search engine can then be synchronized to the mobile device so that the textbox form element on the web search engine's web page shown on the mobile device is automatically populated with the same keywords (e.g., as entered in the desktop web client). Further, other types of data including bookmarks, passwords/autofill data, omnibox data (e.g., statistics about typed URLs, previous queries, etc.), text fields, text areas, select popup, etc., can be synchronized to the mobile device. Other types of data not specifically mentioned herein can be synchronized to the mobile device and still be within the scope of the subject technology.

Although the above example describes synchronizing session data from the desktop web client to the mobile web client, it should be understood that session data could be synchronized between one or more web clients. For example, session data from a mobile web client could be synchronized to a desktop web client in a similar manner described above. Additionally, a mobile web client and/or desktop web client can be synchronized with one or more other web clients (e.g., one or more desktop web clients, one or more mobile web clients, etc.). Moreover, in some configurations a notification is not transmitted to the mobile device to indicate updated session data. Instead, the mobile device can request for the updated session data (if any) from the remote storage server. In some configurations, the remote storage server and the notification server are implemented as a single server for communicating with the mobile device and/or the desktop web client.

FIG. 1 conceptually illustrates an example process 100 for automatically synchronizing session data from one or more web clients. In one example, the process 100 can be implemented by a mobile device for synchronizing session data from a desktop web client and/or other web clients. In some configurations, the process 100 performs the operations described below on a periodic basis to synchronize session data. For instance, the process 100 can detect that updated session data from the one or more web clients is available for updating a mobile web client running on the mobile device.

The process 100 begins at 105 by determining whether updated session data from the one or more web clients is available. In one example, the updated session data is available when receiving a notification of the updated session data from a notification server. The notification server can be a remote server over a network that monitors the session data from the desktop web client. Determining whether the updated session data is available can occur after a mobile web client is activated. The mobile web client in one example is a mobile web browser. The updated session data includes navigation history data of one or more visited web pages on a desktop web client(s). Additionally, the updated session data can include bookmark data (e.g., a locally stored Uniform Resource Identifier) corresponding to one or more web sites (e.g., as stored by the desktop web client(s)). The updated session data can also include tab window data (or other window data) from a desktop web client(s) (or any other web client). In some configurations, the tab window data specifies a universal resource locator indicating a location of a resource. The resource can include web content, image data, audio, video, etc. In one example, the updated session data includes web page form element data based on user input (e.g., when a user provides input for a textbox form element as discussed above).

As mentioned above, other types of data can be included in the updated session data and still be within the scope of the subject technology. For instance, data for persisting web page form elements, one or more bookmarks, passwords/autofill data, omnibox data (e.g., statistics about typed URLs, previous queries, etc.), text fields, text areas, select popup, etc., can be synchronized to the mobile device. Other types of data not specifically mentioned herein can be synchronized to the mobile device and still be within the scope of the subject technology.

The process 100 at 110 then receives updated session data from the one or more web clients over a network if the updated session data is available. As mentioned above, receiving the updated session data can occur within a receiving web client (e.g., mobile web browser on a mobile device). At 115, the process 100 displays the received updated session data in a window of a receiving web client. One example of the displayed session data is described in more detail in connection with FIG. 3 below. The process 100 then ends.

Figure 2:
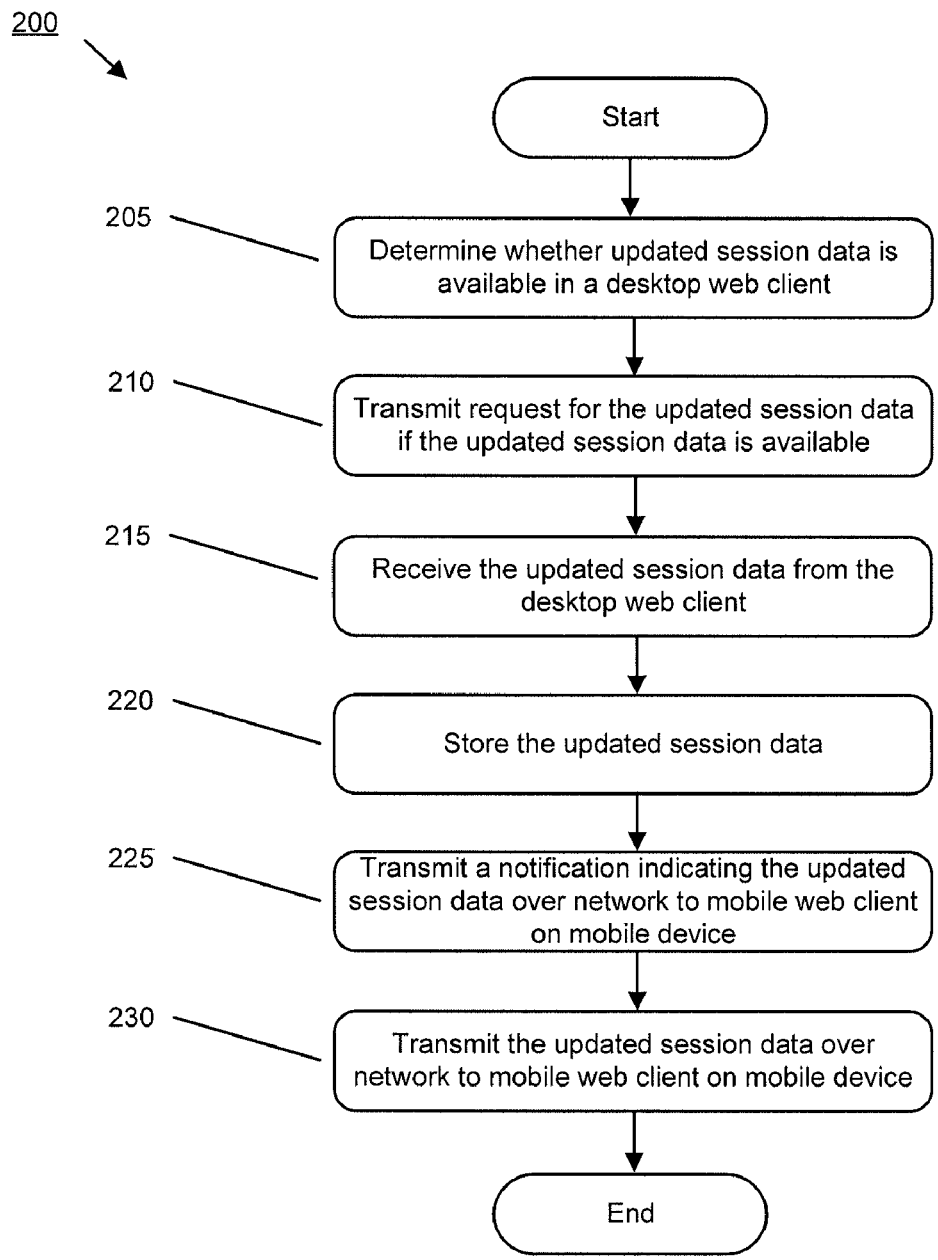
FIG. 2 conceptually illustrates an example process for storing session data from a desktop web client for synchronizing with a mobile web client.

FIG. 2 conceptually illustrates an example process 200 for storing session data from one or more web clients for synchronizing with a first web client. In some configurations, the process 200 can be implemented by a storage server that receives session data from a desktop web client and/or other web clients. The storage server can communicate over a network with the desktop web client and the first web client (e.g., a mobile web client) in some configurations.

The process 200 begins at 205 by determining whether updated session data is available in the one or more web clients. The process 200 at 210 transmits a request for the updated session data if the updated session data is available. In one example, the process 200 transmits the request to the one or more web clients to retrieve the available updated session data. At 215, the process 200 receives the updated session data from the one or more web clients. The process 200 at 220 then stores the updated session data.

In, some configurations, the process 200 transmits a notification at 225 indicating the updated session data over a network to the first web client. The first web client in one example is a mobile web client on a mobile device. For instance, the process 200 can push the notification to the mobile web client on the mobile device. The process 200 at 230 then transmits the updated session data over a network to the first web client. The updated session data includes navigation history data of one or more visited web pages on the desktop web client in one example. The process 200 then ends.

Although the process 200 includes operations for transmitting a request for updated session data at 210 and transmitting a notification at 225, the subject technology is not required to perform all of the aforementioned operations in the process 200. For instance, some configurations of the process 200 can forgo transmitting a request at 210 and/or a notification at 225. In such an instance(s), the process 200 can receive session data at 215 without the request at 210 and/or transmit session data at 230 without a notification at 225.

Figure 3:
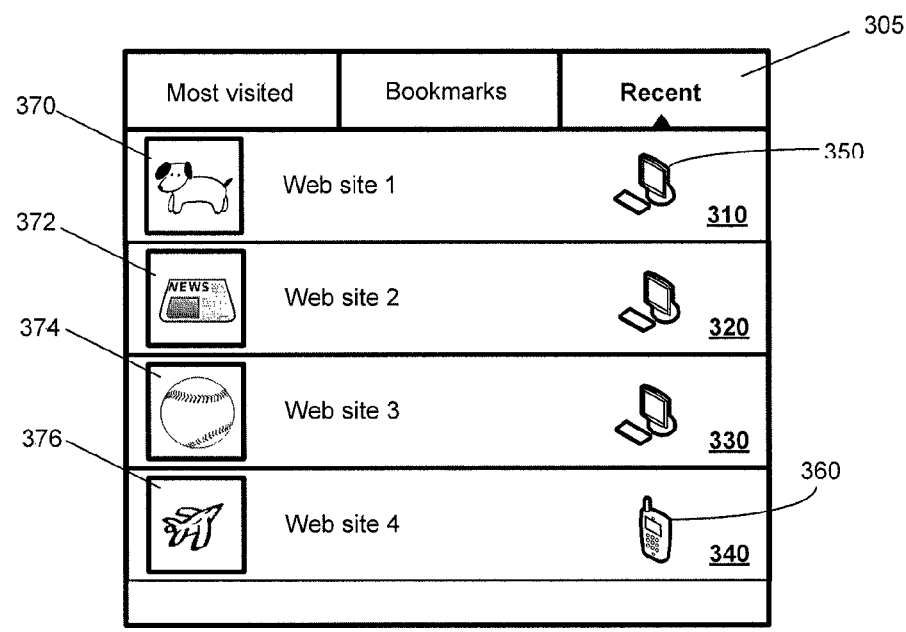
FIG. 3 conceptually illustrates a graphical user interface in which some configurations of the subject technology can be implemented.

FIG. 3 conceptually illustrates a graphical user interface (GUI) 300 in which some configurations of the subject technology can be implemented. More specifically, the GUI 300 can include different sets of graphical elements for displaying session data received or synchronized from a web client (e.g., a desktop web client). A graphical element can include, but is not limited to, a button, check box, radio button, slider, list box, drop-down list, menu, combo box, icon, text box, scroll bar, etc. In one example, the GUI 300 is displayed in the web client after performing the operations in process 100 of FIG. 1. In particular, the GUI 300 can be displayed in a window of a mobile web client (e.g., in a tab window of a mobile web browser) on a mobile device. In another example, the GUI 300 can be displayed in a window of a desktop web client and/or any other web client.

As illustrated in FIG. 3, the GUI 300 includes one or more tabs. In particular, the GUI 300 includes a tab 305 for viewing one or more different display areas 310, 320, 330 and 340. The display areas 310, 320, 330 and 340 respectively include a web site from session data from a desktop web client. In each of the display areas, a web site can include an icon 370, 372, 374 or 376 for indicating a respective web site. Additionally, to indicate a web site included in session data from a desktop web client, the GUI 300 can include an icon 350 indicating a source of session data. As shown, each of the display areas 310, 320, 330 and 340 includes such an icon for indicating the source of session data. For instance, the GUI 300 includes an icon 360 (e.g., representing a mobile device) indicating that a particular web site called "Web site 4" for a web site that is from the mobile web client (e.g., opened on the mobile web client).

A user can interact with the GUI 300 on the mobile web client. By way of example, the user can select any of the display areas 310, 320, 330 and 340 to open or browse the selected web site listed in the respective display area. In one example, the mobile web client can automatically open one or more web sites included in session data from the desktop web client. In this manner, the mobile web client can mirror a user session in the desktop web client.

Although the above description of FIG. 3 includes different example graphical elements in the GUI 300, some implementations can include other graphical elements in the GUI 300 and still be within the scope of the subject technology. Further, the GUI 300 is not required to include all of the aforementioned graphical elements. For instance, the GUI 300 can omit an icon(s) or tab(s) when displaying the session data from the desktop web client and/or mobile web client.

Figure 4:
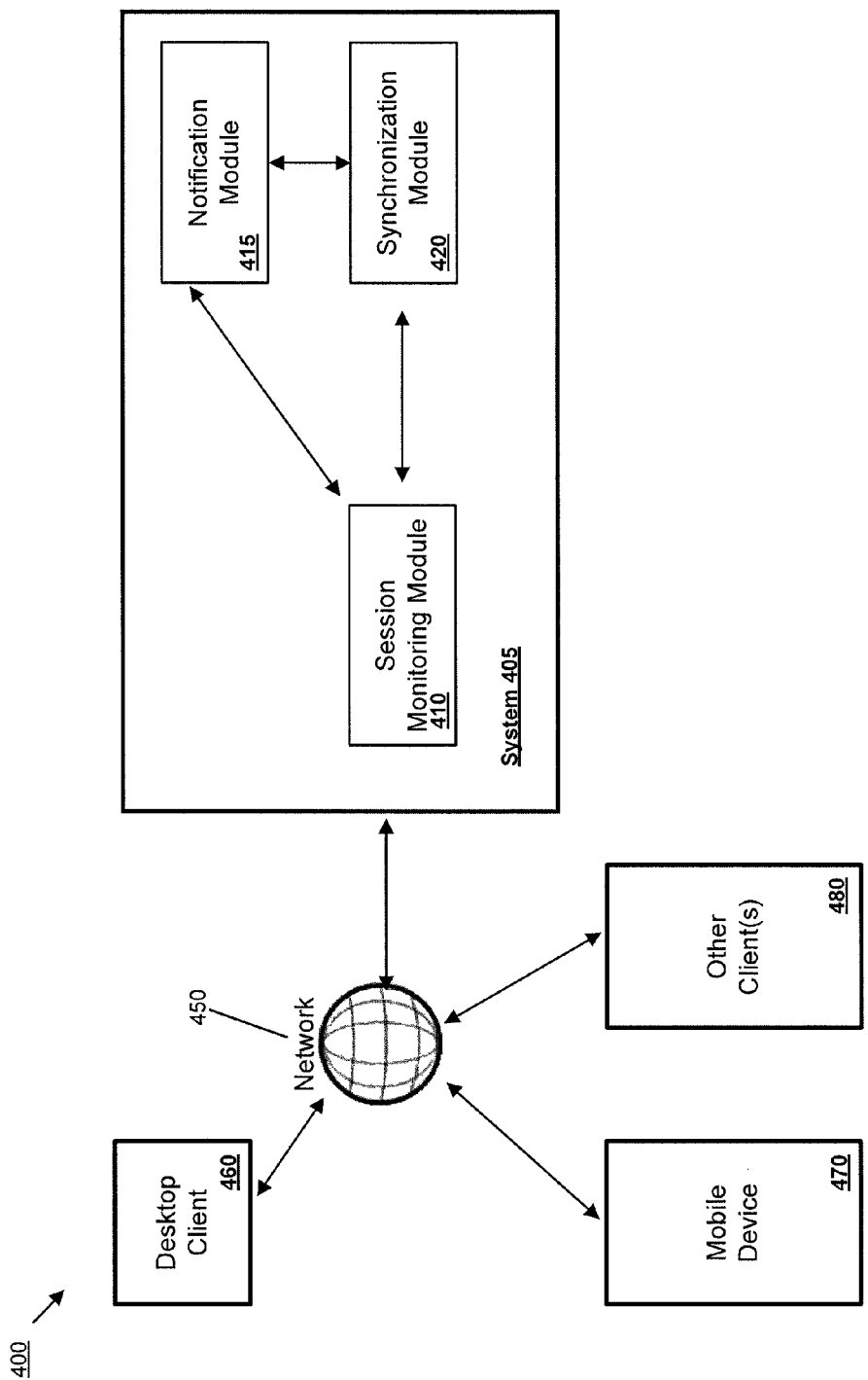
FIG. 4 conceptually illustrates an example computing environment.

FIG. 4 conceptually illustrates an example computing environment 400 including a system. In particular, FIG. 4 shows a system 405 for implementing the above described process in FIG. 2. In some configurations, the system 405 is part of an implementation running a particular machine (e.g., a server).

As shown in FIG. 4, the system 405 includes several modules for providing different functionality. The system 405 is configured to include a session monitoring module 410, a notification module 415 and a synchronization module 420. The session monitoring module 410 is configured to determine whether updated session data is available on one or more web clients. The session monitoring module 410 is further configured to transmit a request to the one or more web clients to determine whether the updated session data is available in which the updated session data indicates browsing activity on the one or more web clients and includes web page form element data based on user input. The notification module 415 is configured to transmit a notification to a first web client if the updated session data is available. In one example, the first web client can be a mobile web client on a mobile device. The notification module 415 is configured to transmit one or more notifications to different web clients (e.g., a desktop web client, another mobile web client, etc.) if the updated session data is available. In some configurations, one or more notifications are transmitted on a periodic basis to the mobile web client and/or other web clients. The synchronization module 420 can receive the updated session data from the one or more web clients. The synchronization module 420 is configured to transmit the updated session data over a network to the first web client (e.g., the mobile web client on the mobile device). The synchronization module is further configured to throttle the transmission of the updated session data in some configurations.

As further shown in FIG. 4, each of the aforementioned modules can be configured to communicate between each other. For instance, different data, messages, API calls and returns can be passed between the different modules in the system 405.

The system 405 can communicate over a network 450 with a desktop client 460 and a mobile device 470 and one or more different clients 480. The desktop client 460, mobile device 470 and one or more different clients 480 can each be configured to communicate with the aforementioned modules of the system 405. For instance, the desktop client 460 can transmit session data over the network 450 to the system 405. The system 405 can then transmit the session data over the network 450 to the mobile device 470 and/or other clients 480.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, any combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

One or more APIs may be used in some configurations. An API is an interface implemented by a program code component or hardware component ("API implementing component") that allows a different program code component or hardware component ("API calling component") to access and use one or more functions, methods, procedures, data structures, classes, and/or other services provided by the API implementing component. An API can define one or more parameters that are passed between the API calling component and the API implementing component.

An API allows a developer of an API calling component (that could be a third party developer) to utilize specified features provided by an API implementing component. There may be one API calling component or there may be more than one such component. An API can be a source code interface that a computing system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some configurations the API implementing component may provide more than one API, each providing a different view of or with different aspects that access different aspects of the functionality implemented by the API implementing component. For example, one API of an API implementing component can provide a first set of functions and can be exposed to third party developers, and another API of the API implementing component can be hidden (not exposed) and provide a subset of the first set of functions and also provide another set of functions, such as testing or debugging functions which are not in the first set of functions. In other configurations the API implementing component may itself call one or more other components via an underlying API and thus be both an API calling component and an API implementing component.

An API defines the language and parameters that API calling components use when accessing and using specified features of the API implementing component. For example, an API calling component accesses the specified features of the API implementing component through one or more API calls or invocations (embodied for example by function or method calls) exposed by the API and passes data and control information using parameters via the API calls or invocations. The API implementing component may return a value through the API in response to an API call from an API calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API calling component) and an API implementing component. Transferring the API calls may include issuing, initiating, invoking, calling, receiving, returning, or responding to the function calls or messages. In other words, transferring can describe actions by either of the API calling component or the API implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API implementing component. The API calling component therefore can declare variables, use pointers to, use or instantiate constant values of such types or classes by using definitions provided in the API.

Generally, an API can be used to access a service or data provided by the API implementing component or to initiate performance of an operation or computation provided by the API implementing component. By way of example, the API implementing component and the API calling component may each be any one of an operating system, a library, a device driver, an API, an application program, or other module (it should be understood that the API implementing component and the API calling component may be the same or different type of module from each other). API implementing components may in some cases be embodied at least in part in firmware, microcode, or other hardware logic. In some configurations, an API may allow a client program to use the services provided by a Software Development Kit (SDK) library. In other configurations an application or other client program may use an API provided by an Application Framework. In these configurations the application or client program may incorporate calls to functions or methods provided by the SDK and provided by the API or use data types or objects defined in the SDK and provided by the API. An Application Framework may in these configurations provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API calling component may be a local component (i.e., on the same data processing system as the API implementing component) or a remote component (i.e., on a different data processing system from the API-implementing component) that communicates with the API-implementing component through the API over a network. It should be understood that an API implementing component may also act as an API calling component (i.e., it may make API calls to an API exposed by a different API implementing component) and an API calling component may also act as an API implementing component by implementing an API that is exposed to a different API calling component.

The API can allow multiple API calling components written in different programming languages to communicate with the API implementing component (thus the API may include features for translating calls and returns between the API implementing component and the API calling component). The API however can be implemented in terms of a specific programming language. An API calling component can, in one configuration, call APIs from different providers such as a set of APIs from an OS provider and another set of APIs from a plug-in provider and another set of APIs from another provider (e.g. the provider of a software library) or creator of the another set of APIs.

The following description describes an example API architecture in which some configurations of the subject technology can be implemented.

Figure 5:
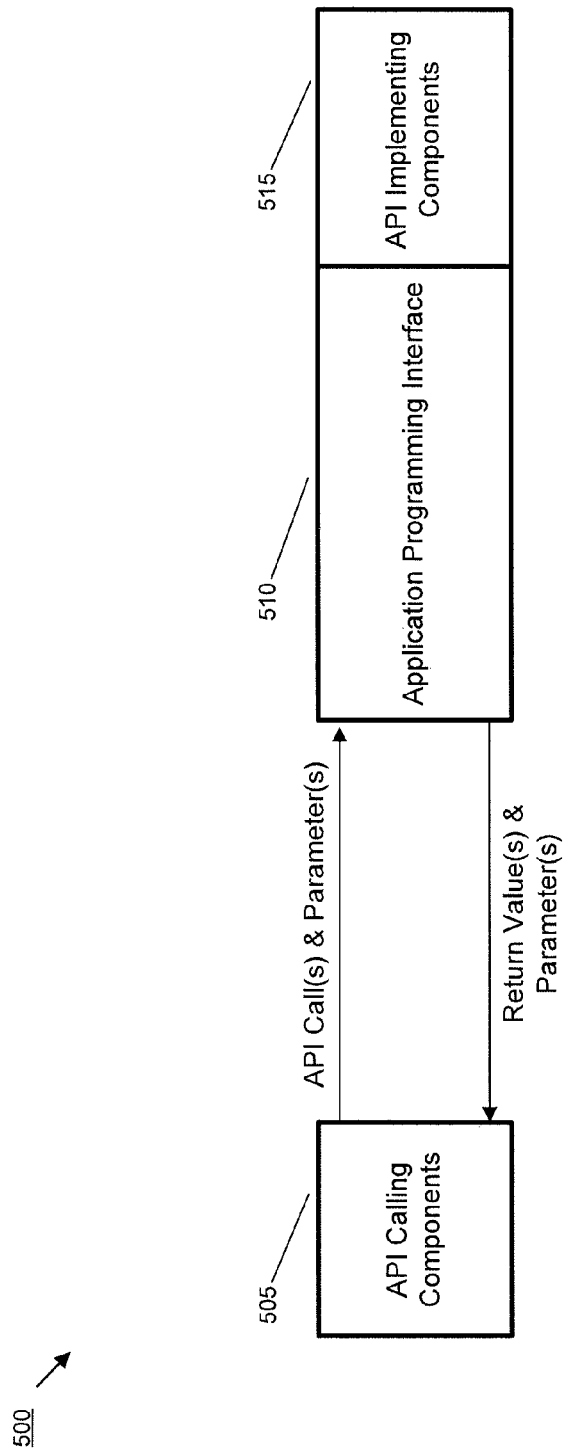
FIG. 5 conceptually illustrates an example application programming interface (API) architecture.

FIG. 5 is a block diagram illustrating an example API architecture, which can be used in some configurations of the subject technology. As shown in FIG. 5, the API architecture 500 includes the API implementing component 515 (e.g., an operating system, a library, a device driver, an API, an application program, software or other module) that implements the API 510. The API 510 specifies one or more functions, methods, classes, objects, protocols, data structures, formats and/or other features of the API-implementing component that can be used by the API-calling component 505. The API 510 can specify at least one calling convention that specifies how a function in the API implementing component receives parameters from the API calling component and how the function returns a result to the API calling component. The API calling component 505 (e.g., an operating system, a library, a device driver, an API, an application program, software or other module), makes API calls through the API 510 to access and use the features of the API implementing component 515 that are specified by the API 510. The API implementing component 515 can return a value through the API 510 to the API calling component 505 in response to an API call.

It will be appreciated that the API implementing component 515 can include additional functions, methods, classes, data structures, and/or other features that are not specified through the API 510 and are not available to the API calling component 505. It should be understood that the API calling component 505 can be on the same system as the API implementing component 515 or can be located remotely and accesses the API implementing component 515 using the API 510 over a network. While FIG. 5 illustrates a single API calling component 505 interacting with the API 510, it should be understood that other API calling components, which can be written in different languages (or the same language) than the API calling component 505, can use the API 510.

The API implementing component 515, the API 510, and the API calling component 505 can be stored in a machine-readable medium, which includes any mechanism for storing information in a form readable by a machine (e.g., a computer or other data processing system). For example, a machine-readable medium includes magnetic disks, optical disks, random access memory, read only memory, flash memory devices, etc.

Figure 6:
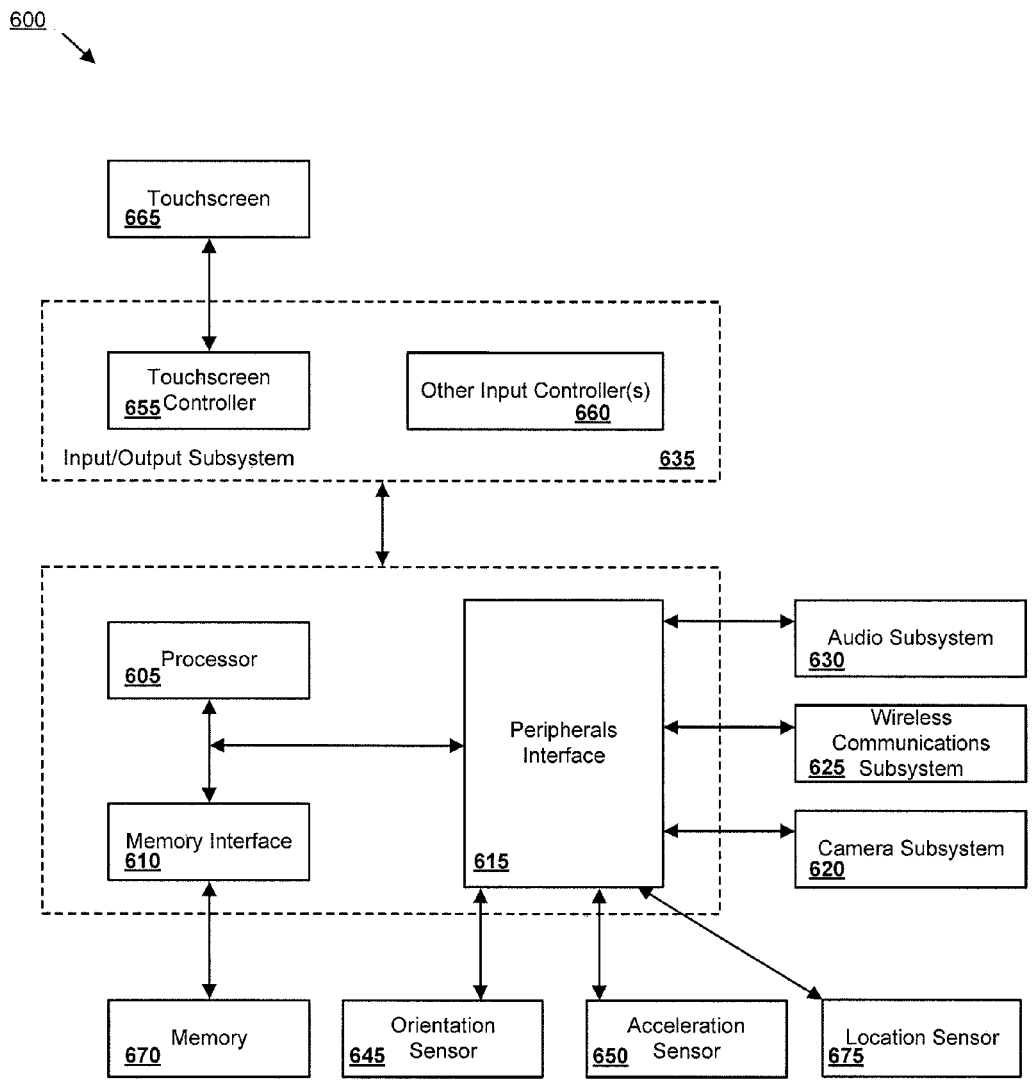
FIG. 6 is an example of a mobile device architecture.

FIG. 6 is an example of a mobile device architecture 600. The implementation of a mobile device can include one or more processing units 605, memory interface 610 and a peripherals interface 615. Each of these components that make up the computing device architecture can be separate components or integrated in one or more integrated circuits. These various components can also be coupled together by one or more communication buses or signal lines.

The peripherals interface 615 can be coupled to various sensors and subsystems, including a camera subsystem 620, a wireless communication subsystem(s) 625, audio subsystem 630 and Input/Output subsystem 635. The peripherals interface 615 enables communication between processors and peripherals. The peripherals provide different functionality for the mobile device. Peripherals such as an orientation sensor 645 or an acceleration sensor 650 can be coupled to the peripherals interface 615 to facilitate the orientation and acceleration functions. Additionally, the mobile device can include a location sensor 675 to provide different location data. In particular, the location sensor can utilize a Global Positioning System (GPS) to provide different location data such as longitude, latitude and altitude.

The camera subsystem 620 can be coupled to one or more optical sensors such as a charged coupled device (CCD) optical sensor or a complementary metal-oxide-semiconductor (CMOS) optical sensor. The camera subsystem 620 coupled with the sensors can facilitate camera functions, such as image and/or video data capturing. Wireless communication subsystems 625 can serve to facilitate communication functions. Wireless communication subsystems 625 can include radio frequency receivers and transmitters, and optical receivers and transmitters. The aforementioned receivers and transmitters can be implemented to operate over one or more communication networks such as a Long Term Evolution (LTE), Global System for Mobile Communications (GSM) network, a Wi-Fi network, Bluetooth network, etc. The audio subsystem 630 is coupled to a speaker and a microphone to facilitate voice-enabled functions, such as voice recognition, digital recording, etc.

I/O subsystem 635 involves the transfer between input/output peripheral devices, such as a display, a touchscreen, etc., and the data bus of the processor 605 through the Peripherals Interface. I/O subsystem 635 can include a touchscreen controller 655 and other input controllers 60 to facilitate these functions. Touchscreen controller 655 can be coupled to the touchscreen 65 and detect contact and movement on the screen using any of multiple touch sensitivity technologies. Other input controllers 60 can be coupled to other input/control devices, such as one or more buttons.

Memory interface 610 can be coupled to memory 670, which can include high-speed random access memory and/or non-volatile memory such as flash memory. Memory 670 can store an operating system (OS). The OS can include instructions for handling basic system services and for performing hardware dependent tasks.

By way of example, memory can also include communication instructions to facilitate communicating with one or more additional devices, graphical user interface instructions to facilitate graphic user interface processing, image/video processing instructions to facilitate image/video-related processing and functions, phone instructions to facilitate phone-related processes and functions, media exchange and processing instructions to facilitate media communication and processing-related processes and functions, camera instructions to facilitate camera-related processes and functions, and video conferencing instructions to facilitate video conferencing processes and functions. The above identified instructions need not be implemented as separate software programs or modules. Various functions of mobile device can be implemented in hardware and/or in software, including in one or more signal processing and/or application specific integrated circuits.

The following description describes an example system in which aspects of the subject technology can be implemented.

Figure 7:
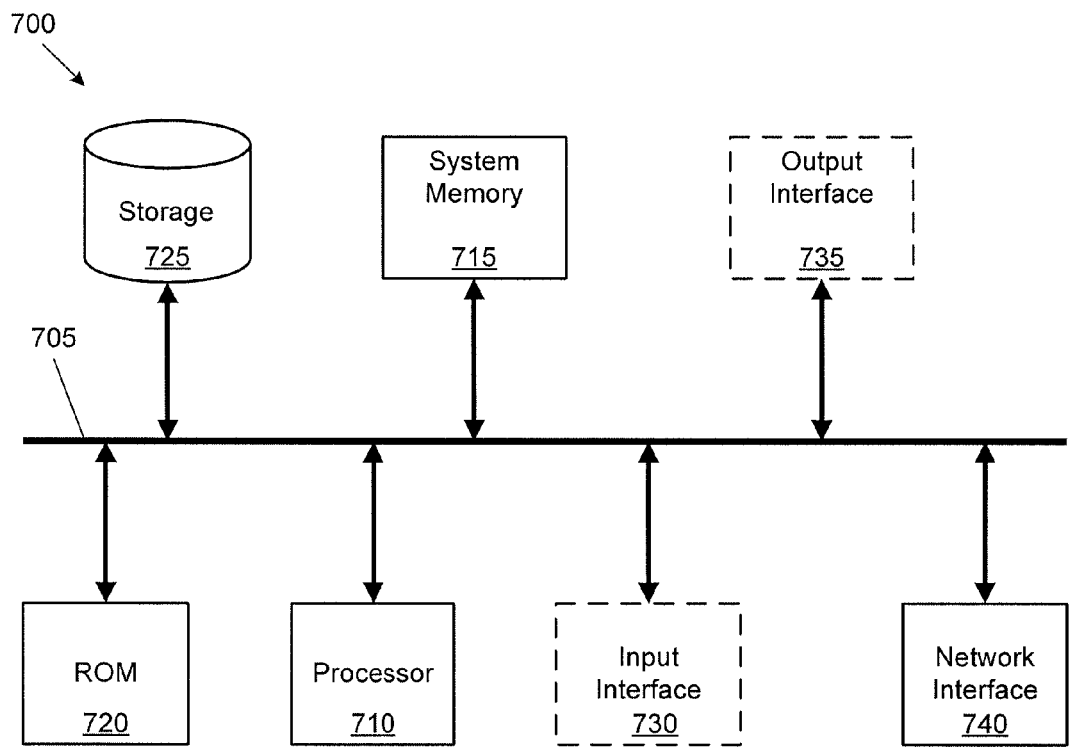
FIG. 7 conceptually illustrates a system with which some implementations of the subject technology may be implemented.

FIG. 7 conceptually illustrates a system 700 with which some implementations of the subject technology can be implemented. The system 700 can be a computer, phone, PDA, or any other sort of electronic device. Such a system includes various types of computer readable media and interfaces for various other types of computer readable media. The system 700 includes a bus 705, processing unit(s) 710, a system memory 715, a read-only memory 720, a storage device 725, an optional input interface 730, an optional output interface 735, and a network interface 740.

The bus 705 collectively represents all system, peripheral, and chipset buses that communicatively connect the numerous internal devices of the system 700. For instance, the bus 705 communicatively connects the processing unit(s) 710 with the read-only memory 720, the system memory 715, and the storage device 725.

From these various memory units, the processing unit(s) 710 retrieves instructions to execute and data to process in order to execute the processes of the subject technology. The processing unit(s) can be a single processor or a multi-core processor in different implementations.

The read-only-memory (ROM) 720 stores static data and instructions that are needed by the processing unit(s) 710 and other modules of the system 700. The storage device 725, on the other hand, is a read-and-write memory device. This device is a non-volatile memory unit that stores instructions and data even when the system 700 is off. Some implementations of the subject technology use a mass-storage device (such as a magnetic or optical disk and its corresponding disk drive) as the storage device 725.

Other implementations use a removable storage device (such as a flash drive, a floppy disk, and its corresponding disk drive) as the storage device 725. Like the storage device 725, the system memory 715 is a read-and-write memory device. However, unlike storage device 725, the system memory 715 is a volatile read-and-write memory, such a random access memory. The system memory 715 stores some of the instructions and data that the processor needs at runtime. In some implementations, the subject technology's processes are stored in the system memory 715, the storage device 725, and/or the read-only memory 720. For example, the various memory units include instructions for processing multimedia items in accordance with some implementations. From these various memory units, the processing unit(s) 710 retrieves instructions to execute and data to process in order to execute the processes of some implementations.

The bus 705 also connects to the optional input and output interfaces 730 and 735. The optional input interface 730 enables the user to communicate information and select commands to the system. The optional input interface 730 can interface with alphanumeric keyboards and pointing devices (also called "cursor control devices"). The optional output interface 735 can provide display images generated by the system 700. The optional output interface 735 can interface with printers and display devices, such as cathode ray tubes (CRT) or liquid crystal displays (LCD). Some implementations can interface with devices such as a touchscreen that functions as both input and output devices.

Finally, as shown in FIG. 7, bus 705 also couples system 700 to a network interface 740 through a network adapter (not shown). In this manner, the computer can be a part of a network of computers (such as a local area network ("LAN"), a wide area network ("WAN"), or an Intranet, or an interconnected network of networks, such as the Internet. Any or all components of system 700 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for automatically synchronizing session data from one or more web clients, the method comprising:

determining, on a mobile device, whether updated session data from the one or more web clients is available, wherein the updated session data indicates browsing activity for a respective session on the one or more web clients and includes web page form element data based on user input received by the one or more web clients during the respective session;

receiving, on the mobile device, updated session data from the one or more web clients over a network if the updated session data is available, wherein the updated session data comprises a current state of browsing activity for the respective session on the one or more web clients, the current state of browsing activity including tabbed window activity of visited web pages during the respective session on the one or more web clients, and at least one of the one or more web clients including a desktop web client running on a desktop computing device; and displaying, after a mobile web client is activated on the mobile device, the received updated session data in a window of the mobile web client on the mobile device, wherein the displayed updated session data in the window of the mobile web client corresponds to the current state of browsing activity for the respective session on the one or more web clients, and the displayed updated session data includes the tabbed window activity of visited web pages and the web page form element data based on user input received by the one or more web clients during the respective session on the one or more web clients.

2. The method of claim 1, wherein the browsing activity for the respective session on the one or more web clients includes navigation history data of one or more visited web pages on the desktop web client.

3. The method of claim 2, wherein the tab window data specifies a universal resource locator indicating a location of a resource.

4. The method of claim 3, wherein the resource includes web content.

5. The method of claim 1, wherein determining whether the updated session data is available comprises receiving a notification of the updated session data from a notification server.

6. The method of claim 1, wherein determining whether the updated session data is available occurs after the mobile web client is activated.

7. The method of claim 1, wherein the updated session data includes respective data corresponding to one or more tabs opened on a device and the respective data corresponding to one or more tabs includes a navigation history of each tab.

8. The method of claim 1, wherein the web page form element data based on user input includes one or more search query terms entered by a user corresponding to a search query in a web search engine.

9. The method of claim 1, wherein the updated session data includes tab window data from the desktop web client.

10. The method of claim 1, further comprising: displaying the received updated session data in a window of the mobile web client.

11. The method of claim 1, wherein the mobile web client is a mobile web browser.

12. A machine-implemented method for storing session data from one or more web clients for synchronizing with a first web client, the method comprising:
    determining whether updated session data is available for a respective session in the one or more web clients, wherein the updated session data includes web page form element data based on user input received by the one or more web clients during the respective session;
    transmitting a request over a network to the one or more web clients for the updated session data if the updated session data is available;
    receiving the updated session data over the network from the one or more web clients, the updated session data comprising a current state of browsing activity for the respective session on the one or more web clients, the current state of browsing activity including tabbed window activity of visited web pages during the respective session in the one or more web clients, and at least one of the one or more web clients including a desktop web client running on a desktop computing device; and
    transmitting the updated session data over the network to a mobile web client on a mobile device for display on the mobile web client on the mobile device, wherein the transmitted updated session data corresponds to the current state of browsing activity for the respective session in the one or more web clients, and the transmitted updated session data includes the tabbed window activity of visited web pages and the web page form element data based on user input received by the one or more web clients during the respective session in the one or more web clients.

13. The method of claim 12, further comprising:
    transmitting a notification indicating the updated session data over the network to the mobile web client on the mobile device.

14. The method of claim 13, wherein the notification is pushed to the mobile web client on the mobile device.

15. The method of claim 12, wherein the browsing activity for the respective session in the one or more web clients includes navigation history data that includes one or more different web sites visited by the desktop web client.

16. The method of claim 12, wherein the web page form element data based on user input includes one or more search query terms entered by a user corresponding to a search query in a web search engine.

17. The method of claim 13, further comprising:
    transmitting the updated session data over the network to the mobile web client on the mobile device, wherein the updated session data includes navigation history data of one or more visited web pages on the desktop web client.

18. A system for automatically synchronizing session data from one or more web clients, the system comprising:
    memory;
    one or more processors;
    one or more modules stored in memory and configured for execution by the one or more processors, the modules comprising:
    a session monitoring module configured to determine whether updated session data is available for a respective session on the one or more web clients, wherein the updated session data indicates browsing activity on the one or more web clients and includes web page form element data based on user input received by the one or more web clients during the respective session, the updated session data comprising a current state of browsing activity for the respective session on the one or more web clients, the current state of browsing activity including tabbed window activity of visited web pages during the respective session on the one or more web clients, and at least one of the one or more web clients including a desktop web client running on a desktop computing device;
    a notification module configured to transmit a notification to a first web client if the updated session data is available; and
    a synchronization module configured to transmit the updated session data over a network to the first web client for display on the first web client, wherein the transmitted updated session data corresponds to the current state of browsing activity for the respective session on the one or more web clients, and the transmitted updated session data includes the tabbed window activity of visited web pages and the web page form element data based on user input received by the one or more web clients during the respective session on the one or more web clients.

19. The system of claim 18, wherein session monitoring module is further configured to transmit a request to the one or more web clients to determine whether the updated session data is available.

20. The system of claim 18, wherein one or more notifications are transmitted on a periodic basis to a mobile web client on a mobile device.

21. The system of claim 18, wherein the synchronization module is further configured to throttle the transmission of the updated session data.

22. The system of claim 18, wherein the web page form element data based on user input includes one or more search query terms entered by a user corresponding to a search query in a web search engine.

23. A non-transitory machine-readable medium comprising instructions stored therein, which when executed by a machine, cause the machine to perform operations comprising:
    determining whether updated session data is available for a respective session in one or more web clients, wherein the updated session data includes web page form element data based on user input received by the one or more web clients during the respective session;

transmitting a request over a network to the one or more web clients for the updated session data if the updated session data is available;

receiving the updated session data over the network from the one or more web clients, the updated session data comprising a current state of browsing activity for the respective session in the one or more web clients, the current state of browsing activity including tabbed window activity of visited web pages during the respective session in the one or more web clients, and at least one of the one or more web clients including a desktop web client running on a desktop computing device; and transmitting the updated session data over a network to a first web client for display on the first web client, wherein the transmitted updated session data corresponds to the current state of browsing activity for the respective session in the one or more web clients, and the transmitted updated session data includes the tabbed window activity of visited web pages and the web page form element data based on user input received by the one or more web clients during the respective session in the one or more web clients.

24. The non-transitory machine-readable medium of claim 23, wherein the browsing activity for the respective session in the one or more web clients includes navigation history data of one or more visited web pages on the one or more web clients.

25. The non-transitory machine-readable medium of claim 23, wherein the first web client is a mobile web client on a mobile device.

26. The machine-readable medium of claim 23, wherein the web page form element data based on user input includes one or more search query terms entered by a user corresponding to a search query in a web search engine.

* * * * *